(12) United States Patent
Ogawa (10) Patent No.: US 10,634,908 B2
(45) Date of Patent: Apr. 28, 2020

(54) DISPLAY DEVICE AND DISPLAY DEVICE MAIN BODY INCLUDING FIRST AND SECOND EMITTING PORTIONS

(71) Applicant: Yazaki Corporation, Tokyo (JP)

(72) Inventor: Takayuki Ogawa, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/816,060

(22) Filed: Nov. 17, 2017

(65) Prior Publication Data
US 2018/0210203 A1    Jul. 26, 2018

(30) Foreign Application Priority Data

Jan. 26, 2017   (JP) .................................. 2017-012361

(51) Int. Cl.
*G02B 27/01* (2006.01)
*G02B 17/02* (2006.01)
(Continued)

(52) U.S. Cl.
CPC .......... *G02B 27/0101* (2013.01); *B60K 35/00* (2013.01); *B60K 37/04* (2013.01);
(Continued)

(58) Field of Classification Search
CPC .... G02B 27/0101; G02B 17/02; G02B 27/01; G02B 27/0149; G02B 2027/011;
(Continued)

(56) References Cited

U.S. PATENT DOCUMENTS 5,784,036 A * 7/1998 Higuchi ................. B60K 35/00
345/173
8,950,868 B2 * 2/2015 Aoki ................. G02B 27/0101
345/7
(Continued)

FOREIGN PATENT DOCUMENTS

GB     2 006 981 A    5/1979
JP     2-30985 U      2/1990
(Continued)

OTHER PUBLICATIONS

Communication dated Mar. 26, 2019 issued by the Japanese Patent Office in counterpart application No. 2017-012361.

*Primary Examiner* — Cara E Rakowski
*Assistant Examiner* — Magda Cruz
(74) *Attorney, Agent, or Firm* — Sughrue Mion, PLLC (57) ABSTRACT

A display device includes a display device main body, a first display surface, and a second display surface, and the display device main body includes a first emitting portion, a second emitting portion, and a housing accommodating them. The first emitting portion emits first display light. The first display surface is provided on a transmission member transmitting light and reflects, to a viewing position side, the first display light being emitted from the first emitting portion. The second emitting portion emits second display light that is different from the first display light. The second display surface is provided on a non-transmission member shielding light and forming at least a part of a light path of the first display light to the first display surface from the first emitting portion and reflects, to the viewing position side, the second display light being emitted from the second emitting portion.

10 Claims, 3 Drawing Sheets

(51) Int. Cl.
 *B60K 35/00* (2006.01)
 *B60K 37/04* (2006.01)
(52) U.S. Cl.
 CPC .............. *G02B 17/02* (2013.01); *G02B 27/01*
 (2013.01); *B60K 2370/334* (2019.05); *B60K 2370/66* (2019.05); *B60K 2370/67* (2019.05); *G02B 27/0149* (2013.01); *G02B 2027/011* (2013.01); *G02B 2027/0141* (2013.01); *G02B 2027/0165* (2013.01)
(58) Field of Classification Search
 CPC .... G02B 2027/0141; G02B 2027/0165; B60K 35/00; B60K 2350/2052
 See application file for complete search history.

(56) References Cited

U.S. PATENT DOCUMENTS

| | | | | |
|---|---|---|---|---|
| 9,678,340 | B2* | 6/2017 | Kanamori | G02B 27/01 |
| 10,018,841 | B1* | 7/2018 | Chen | G02B 27/0101 |
| 10,254,551 | B2* | 4/2019 | Kishigami | G02B 27/0179 |
| 2003/0016451 | A1* | 1/2003 | Aoki | G02B 27/01 |
| | | | | 359/633 |
| 2009/0231116 | A1* | 9/2009 | Takahashi | B60K 35/00 |
| | | | | 340/461 |
| 2010/0067118 | A1* | 3/2010 | Takahashi | G02B 27/01 |
| | | | | 359/633 |
| 2011/0175798 | A1* | 7/2011 | Sato | B60K 35/00 |
| | | | | 345/7 |
| 2013/0176335 | A1* | 7/2013 | Sugiyama | B60K 35/00 |
| | | | | 345/633 |
| 2014/0253821 | A1* | 9/2014 | Takatoh | B60K 35/00 |
| | | | | 349/11 |
| 2016/0025976 | A1* | 1/2016 | Ogawa | G02B 27/0149 |
| | | | | 359/630 |
| 2017/0052368 | A1* | 2/2017 | Takahashi | B60K 35/00 |
| 2017/0299862 | A1* | 10/2017 | Yamaguchi | B60K 35/00 |
| 2018/0023970 | A1* | 1/2018 | Iguchi | G02B 27/01 |
| | | | | 345/7 |
| 2018/0188529 | A1* | 7/2018 | Sato | B60K 35/00 |
| 2019/0235240 | A1* | 8/2019 | Nagano | B60K 35/00 |

FOREIGN PATENT DOCUMENTS

| | | |
|---|---|---|
| JP | 2010-164941 A | 7/2010 |
| JP | 2015-102603 A | 6/2015 |
| JP | 2016-028934 A | 3/2016 |
| WO | 2007/057607 A1 | 5/2007 |

* cited by examiner

FIG.2

DISPLAY DEVICE AND DISPLAY DEVICE MAIN BODY INCLUDING FIRST AND SECOND EMITTING PORTIONS

CROSS-REFERENCE TO RELATED APPLICATION(S)

The present application claims priority to and incorporates by reference the entire contents of Japanese Patent Application No. 2017-012361 filed in Japan on Jan. 26, 2017.

BACKGROUND OF THE INVENTION

1. Field of the Invention

The present invention relates to a display device and a display device main body.

2. Description of the Related Art

As a conventional display device that is applied to vehicles and the like, for example, Japanese Patent Application Laid-open No. 2016-028934 discloses a vehicle display device including an irradiation unit and a display unit. The irradiation unit emits display light through an opening located at a position facing a reflection member and projects the display light onto the reflection member to display information to passengers. The display unit is arranged on an opening side surface provided in an opening peripheral edge portion and displays the information to the passengers.

The above-mentioned vehicle display device disclosed in Japanese Patent Application Laid-open No. 2016-028934 has a further room for improvement in the point that mountability on a place at which an installation space for providing the display unit is difficult to be ensured, such as an instrument panel of a vehicle, is improved.

SUMMARY OF THE INVENTION

The present invention has been made in view of the above circumstance, and an object of the present invention is to provide a display device and a display device main body that can improve mountability.

In order to achieve the above mentioned object, a display device according to one aspect of the present invention includes a first emitting portion emitting first display light; a first display surface provided on a transmission member transmitting light and reflecting, to a viewing position side, the first display light being emitted from the first emitting portion; a second emitting portion emitting second display light that is different from the first display light; and a second display surface provided on a non-transmission member shielding light and forming at least a part of a light path of the first display light to the first display surface from the first emitting portion, and reflecting, to the viewing position side, the second display light being emitted from the second emitting portion.

According to another aspect of the present invention, in the display device, it is possible to further includes a housing that defines an accommodation space portion inside accommodating the first emitting portion and the second emitting portion.

According to still another aspect of the present invention, in the display device, it is possible to configure that the first emitting portion and the second emitting portion are provided at an opposite side to the second display surface with the light path interposed.

According to still another aspect of the present invention, in the display device, it is possible to further includes a reflection portion reflecting, to the first display surface side, the first display light being emitted from the first emitting portion, wherein the second emitting portion is provided at a position opposing the second display surface in an emitting direction of the second display light.

In order to achieve the above mentioned object, a display device main body according to still another aspect of the present invention includes a first emitting portion capable of emitting first display light toward a first display surface provided on a transmission member transmitting light; a second emitting portion capable of emitting second display light that is different from the first display light toward a second display surface provided on a non-transmission member shielding light and forming at least a part of a light path of the first display light to the first display surface from the first emitting portion; and a housing that defines an accommodation space portion inside accommodating the first emitting portion and the second emitting portion, wherein the housing is installed at such a position that the first display surface reflects, to a viewing position side, the first display light being emitted from the first emitting portion and the second display surface reflects, to the viewing position side, the second display light being emitted from the second emitting portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 2:
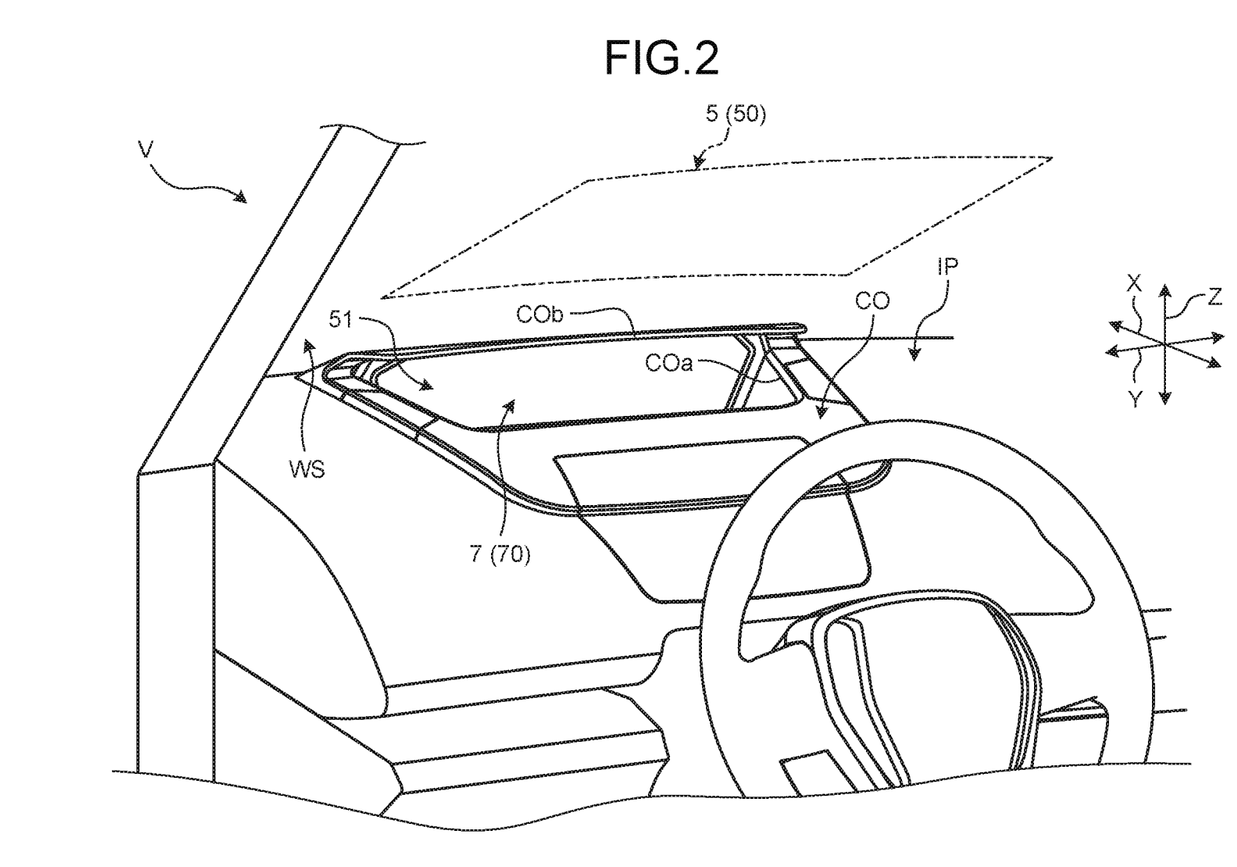
FIG. 2 is a schematic plan view of the inside of a vehicle cabin that illustrates the display device in the embodiment.
Figure 3:
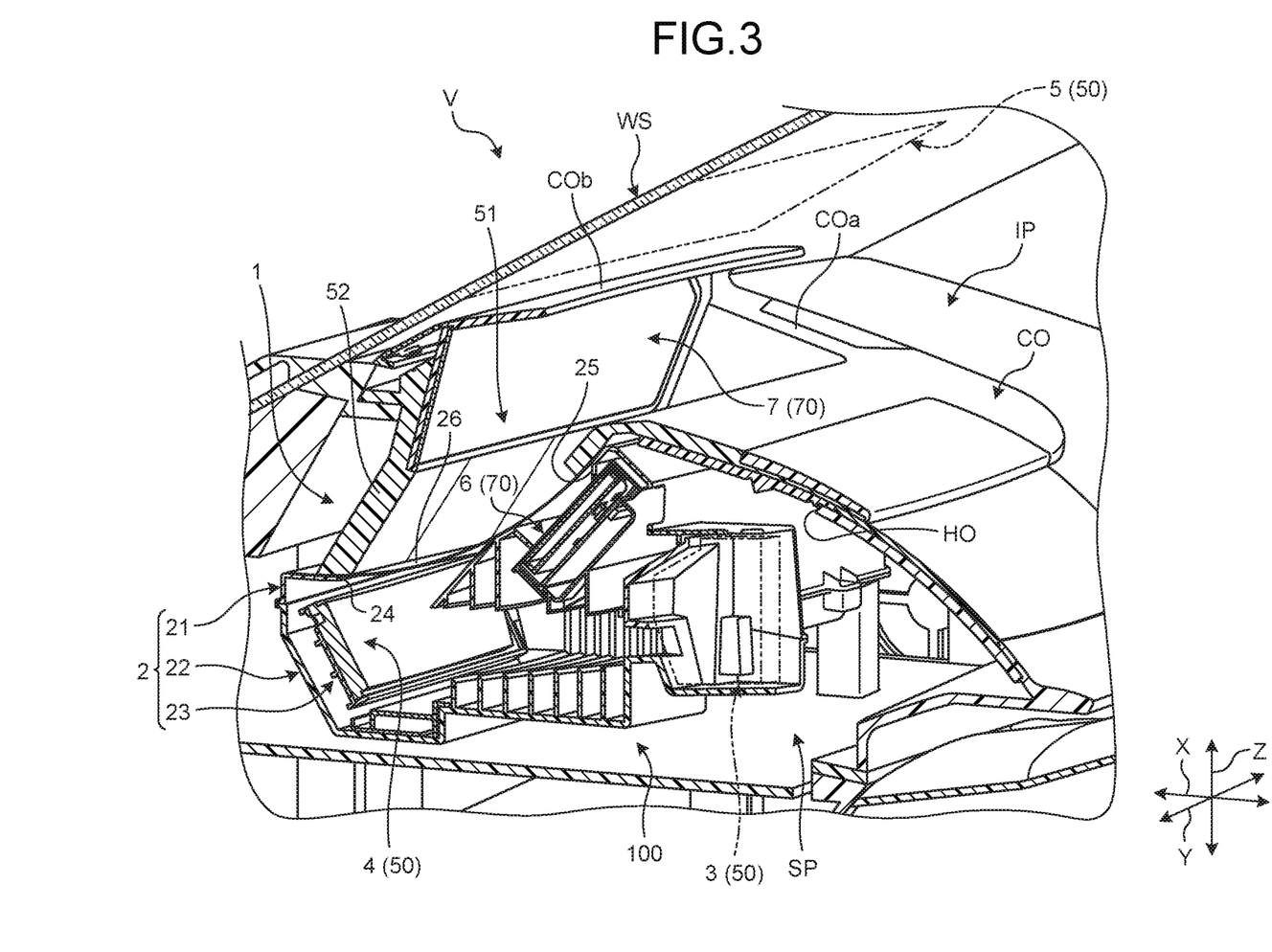
FIG. 3 is a partial cross-sectional perspective view illustrating the display device in the embodiment.

Hereinafter, an embodiment of the present invention will be described in detail with reference to the drawings. It should be noted that the embodiment does not limit this invention. Components in the following embodiment include components by which those skilled in the art can replace easily or substantially the same components. FIG. 2 and FIG. 3 illustrate a region corresponding to a first display surface included in a display device with a two-dot chain line. Furthermore, FIG. 2 and FIG. 3 omit illustration of images that are displayed on the first display surface and a second display surface. FIG. 3 omits a first emitting unit included in the display device with two-dot chain lines for illustration.

Embodiment

Figure 1:
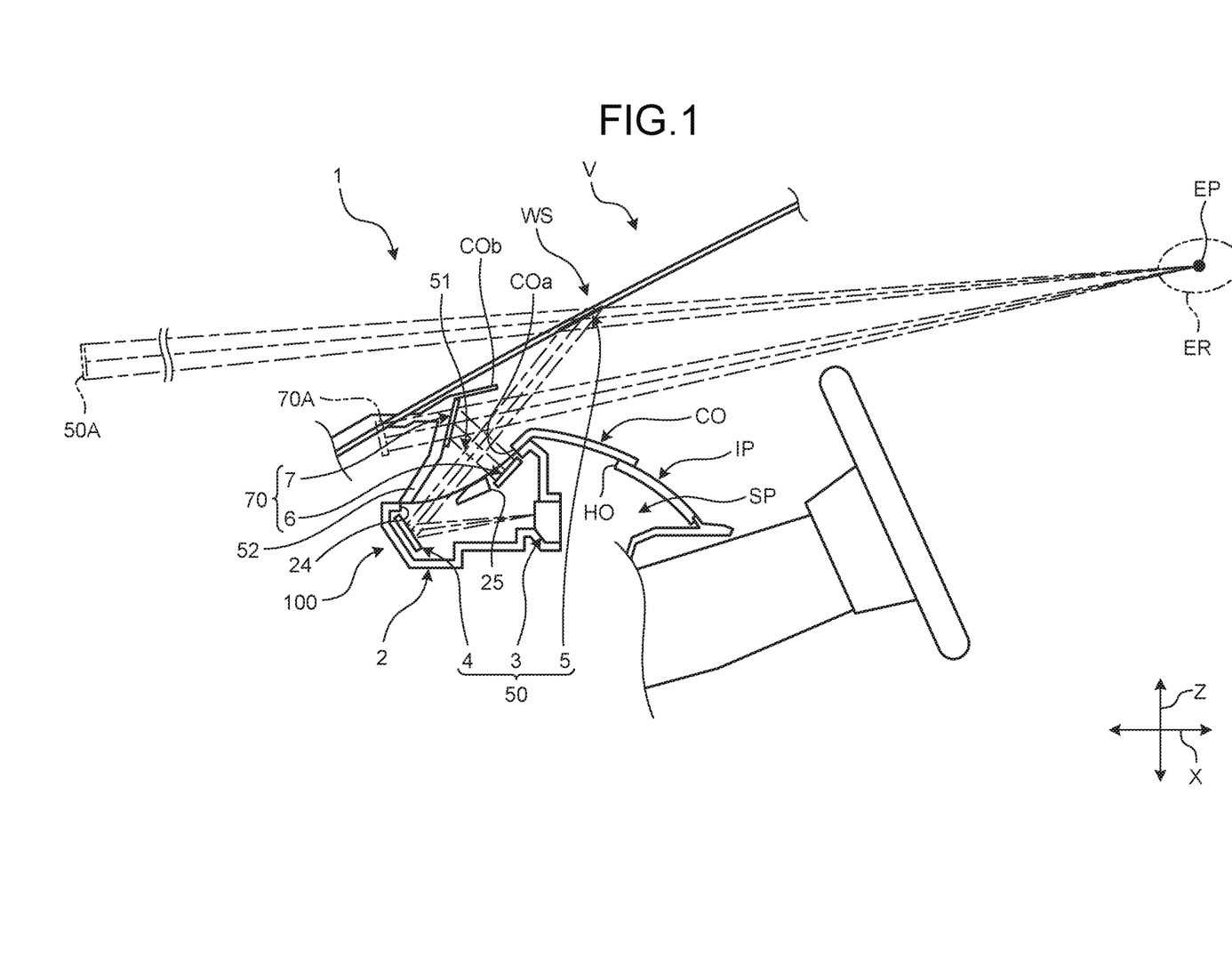
FIG. 1 is a schematic plan view illustrating the schematic configuration of a display device according to an embodiment.

A display device 1 according the embodiment illustrated in FIG. 1, FIG. 2, and FIG. 3 is applied to a vehicle V. The display device 1 configures a digital in-vehicle meter with which a what-is-called head up display (HUD) is integrated. The display device 1 is mounted in, for example, an instrument panel IP provided on a dashboard of the vehicle V. The display device 1 displays various pieces of visible information related to the vehicle V as pieces of information that are provided for driving of the vehicle V. Hereinafter, the configuration of the display device 1 will be described in detail with reference to the respective drawings.

In the following description, in the vehicle V to which the display device 1 is applied, a "vehicle front and rear direction X" typically corresponds to the entire length direction of the vehicle V, to be specific, corresponds to a direction along the forward and backward advancing direction of the vehicle V. A "vehicle width direction Y" typically corresponds to the entire width direction of the vehicle V, to be specific, corresponds to the vehicle right and left direction of the vehicle V. A "vehicle height direction Z" typically corresponds to the height direction of the vehicle V. The vehicle front and rear direction X as a first direction, the vehicle width direction as a second direction, and the vehicle height direction as a third direction are orthogonal to one another. In a state in which the vehicle V is located on a horizontal plane, the vehicle front and rear direction X and the vehicle width direction Y are along the horizontal direction and the vehicle height direction Z is along the vertical direction. In the following description, in the vehicle front and rear direction X, the side to which the vehicle V advances forward is referred to as a "front side" whereas the side to which the vehicle V advances backward is referred to as a "rear side" in some cases. In the vehicle width direction Y, the left side when viewed at a position facing the front side in the vehicle front and rear direction X is referred to as a "left side" whereas the right side when viewed at a position facing the front side in the vehicle front and rear direction X is referred to as a "right side" in some cases. In the vehicle height direction Z, the upper side in the vertical direction is referred to as an "upper side" whereas the lower side in the vertical direction is referred to as a "lower side" in some cases. The respective directions that are used in the following description indicate directions in a state in which respective parts are assembled on one another unless otherwise specified.

To be specific, the display device 1 includes a housing 2, a first emitting portion 3, a reflection portion 4, a first display surface 5, a second emitting portion 6, and a second display surface 7. The housing 2, the first emitting portion 3, the reflection portion 4, and the second emitting portion 6 configure a display device main body 100. In other words, the display device 1 includes the display device main body 100, the first display surface 5, and the second display surface 7. The display device main body 100 includes the housing 2, the first emitting portion 3, the reflection portion 4, and the second emitting portion 6.

The housing 2 defines an accommodation space portion 23 inside accommodating the first emitting portion 3, the reflection portion 4, the second emitting portion 6, and the like. In addition, the housing 2 also accommodates various components for controlling and driving the respective parts of the display device 1, such as a control circuit and a driving circuit. The housing 2 is made of, for example, insulating synthetic resin. The housing 2 includes an upper housing 21, a lower housing 22, and the accommodation space portion 23. The housing 2 is formed into a hollow box shape by the upper housing 21 and the lower housing 22. The upper housing 21 and the lower housing 22 are combined while the upper housing 21 is located at the upper side in the vehicle height direction Z and the lower housing 22 is located at the lower side in the vehicle height direction Z. With this configuration, the upper housing 21 and the lower housing 22 form an internal space portion thereof into a hollow shape. The accommodation space portion 23 is the internal space portion surrounded by the upper housing 21 and the lower housing 22. The accommodation space portion 23 accommodates therein the first emitting portion 3, the reflection portion 4, the second emitting portion 6, and the like. The housing 2 has a first light path opening 24 and a second light path opening 25 that are formed in the upper surface of the upper housing 21 in the vehicle height direction Z. Each of the first light path opening 24 and the second light path opening 25 communicates the inside and the outside of the housing 2. The first light path opening 24 configures a light path opening for guiding first display light emitted from the first emitting portion 3 to the outside of the housing 2. The second light path opening 25 configures a light path opening for guiding second display light emitted from the second emitting portion 6 to the outside of the housing 2. Both of the first light path opening 24 and the second light path opening 25 face the front side in the vehicle front and rear direction X, in this example, the opposite side to a viewing position EP, which will be described later. The first light path opening 24 and the second light path opening 25 are formed while the first light path opening 24 is located at the lower side in the vehicle height direction Z and the second light path opening 25 is located at the upper side in the vehicle height direction Z. The first light path opening 24 and the second light path opening 25 of the housing 2 are covered by a transparent cover member 26. The transparent cover member 26 is configured by a light-transmitting member transmitting at least the first display light emitted from the first emitting portion 3 and the second display light emitted from the second emitting portion 6.

The housing 2 is installed in an installation space portion SP formed in the instrument panel IP. The instrument panel IP is a member that is provided in the vehicle V at the vehicle cabin internal side at which a driver's seat and the like are provided and at the front side in the vehicle front and rear direction X. The instrument panel IP extends along the vehicle width direction Y. The instrument panel IP is an interior member that is provided so as to be exposed to a space portion at the vehicle cabin internal side and is a section member defining the installation space portion SP as the internal space portion between the instrument panel IP and a wall surface of a body of the vehicle V at the front side in the vehicle front and rear direction X. The housing 2 is installed in the installation space portion SP through an installation hole portion HO formed in the instrument panel IP. It should be noted that the installation hole portion HO is hidden by being covered by a cover member CO that is provided after installation of the housing 2 is completed.

The first emitting portion 3, the reflection portion 4, and the first display surface 5 configure an HUD unit 50. The HUD unit 50 emits the first display light toward the first display surface 5 from the first emitting portion 3 through the reflection portion 4 and presents various pieces of visual information to a driver and the like with an image 50A with the first display light reflected by the first display surface 5.

The first emitting portion 3 can emit the first display light toward the first display surface 5. The first emitting portion 3 is provided in the accommodation space portion 23 of the housing 2. The first display light emitted from the first emitting portion 3 is display light providing the image 50A that is displayed on the first display surface 5 and includes at least light of a wavelength in a visible light region. As the first emitting portion 3 as a device emitting the first display light, for example, a thin liquid crystal display, a plasma display, an organic electroluminescence (EL) display, an optical indicator, a fluorescent display tube, a laser irradiation device, a projector, or the like can be used.

The reflection portion 4 configures a light path changing optical system that changes a light path of the first display light emitted from the first emitting portion 3 in the accommodation space portion 23 of the housing 2. The reflection portion 4 is provided at a position opposing the first light path opening 24 in the accommodation space portion 23 of the housing 2. The reflection portion 4 reflects, to the first display surface 5 side, the first display light emitted from the first emitting portion 3. The reflection portion 4 totally reflects, to the first display surface 5 side, the first display light emitted from the first emitting portion 3 and includes a magnifying mirror (magnifying mirror surface) magnifying the first display light. Only one reflection portion 4 is illustrated herein but a plurality of optical systems may be included. The reflection portion 4 may include, for example, a free curved-surface mirror that optically corrects distortion of the first display light emitted from the first emitting portion 3 and reflects the first display light. Furthermore, the reflection portion 4 may include an adjustment mechanism for finely adjusting a reflection angle of the first display light. The first display light reflected to the first display surface 5 side by the reflection portion 4 is guided to the outside of the housing 2 through the first light path opening 24.

The first display surface 5 displays various pieces of visible information with the first display light emitted from the first emitting portion 3. The first display surface 5 is provided at the outside of the accommodation space portion 23 of the housing 2. The first display surface 5 is provided on a window shield WS of the vehicle V. The window shield WS is a light-transmitting transmission member that transmits at least light of the wavelength in the visible light region. The window shield WS is provided on a front portion of the vehicle V and is also referred to as a what-is-called front glass. The first display surface 5 is configured by the surface of the window shield WS at the vehicle cabin internal side. The first display surface 5 reflects, to the viewing position (eye point) EP side, the first display light emitted from the first emitting portion 3 and reflected by the reflection portion 4. Typically, the viewing position EP is previously supposed to be located in a what-is-called eye range ER in the vehicle V. The eye range ER is a "driver's eye range of an automobile" and corresponds to a region that is previously determined depending on the vehicle and in which a viewpoint of the driver is located. Typically, the eye range ER statistically expresses distribution of positions of the eyes of drivers in the vehicle V, and corresponds to, for example, a region including the positions of the eyes of a predetermined percentage (for example, 95%) of drivers of in a state in which the drivers sit on the driver's seat. The first display surface 5 is configured herein by the surface of the window shield WS at the viewing position EP side in this example. The first display surface 5 is provided on the window shield WS at a position enabling the driver to view the image 50A displayed on the first display surface 5 in a state in which the driver views the front side in the traveling direction of the vehicle V. The first display surface 5 is provided at, for example, a position enabling the driver to view the image 50A displayed on the first display surface 5 with a peripheral visual field thereof in the state in which the driver straightly views the front side in the traveling direction of the vehicle V. The first display surface 5 is not limited to be provided at the above-mentioned position and may be provided at a position enabling the driver to view the image 50A displayed on the first display surface 5 with a center visual field thereof.

The display device 1 in the embodiment includes a light path 51 reaching the first display surface 5 from the reflection portion 4 side. A light path formation wall body 52 forms a part of the light path 51. The light path formation wall body 52 is a light-shielding non-transmission member that shields at least light of the wavelength in the visible light region. The light path formation wall body 52 is provided in the installation space portion SP. The light path formation wall body 52 is provided at the front side of the first light path opening 24 and the second light path opening 25 of the housing 2, that is, at the opposite side to the viewing position EP with respect to the first light path opening 24 and the second light path opening 25 in the vehicle front and rear direction X. The light path formation wall body 52 opposes the first light path opening 24 and the second light path opening 25 with spaces from the first light path opening 24 and the second light path opening 25 in the vehicle front and rear direction X. The light path formation wall body 52 extends from an edge portion of the first light path opening 24 along the vehicle height direction Z and passes through an opening COa formed in the cover member CO along the vehicle height direction Z. A part of the light path formation wall body 52 is exposed at the upper side of the cover member CO in the vehicle height direction Z through the opening COa. The light path formation wall body 52 configured as described above defines the light path 51 between the light path formation wall body 52 and the housing 2. The first light path opening 24 and the second light path opening 25 are opened to the light path 51. The light path 51 is a portion located at the outside of the housing 2 in a propagation path of the first display light to the first display surface 5 from the first emitting portion 3. The light path 51 extends from the first light path opening 24 along the vehicle height direction Z and extends to the first display surface 5 while passing through the rear side of a hood portion Cob formed on the cover member CO in the vehicle front and rear direction X, that is, the viewing position EP side.

The HUD unit 50 configured as described above causes the first display light emitted from the first emitting portion 3 to be reflected to the first display surface 5 side by the reflection portion 4. The HUD unit 50 causes the first display light reflected by the reflection portion 4 to reach the first display surface 5 through the first light path opening 24 and the light path 51 and to be reflected to the viewing position EP side by the first display surface 5. With this configuration, the HUD unit 50 displays the image 50A with the first display light on the first display surface 5. The image 50A is a reflected image with the first display light after reflection to the viewing position EP side by the first display surface 5 and is a what-is-called virtual image capable of being viewed from the viewing position EP. The image 50A represents various pieces of visible information related to the vehicle V. The image 50A represents, for example, various pieces of visible information that are advantageous for the passengers of the vehicle V, such as traveling state information of the vehicle V, guidance information until the vehicle V arrives at a destination, and external environment information of the vehicle V. The image 50A may represent, for example, attention object information (for example, walkers, peripheral vehicles, and information related to approaching and the like of obstacles and the like) around the vehicle V with relatively simple figures that the passengers and the like are easy to intuitively recognize as intuitive information without giving troublesome feeling.

The second emitting portion 6 and the second display surface 7 configure a meter unit 70. The meter unit 70 emits the second display light toward the second display surface 7 from the second emitting portion 6 and presents various pieces of visual information to the driver and the like with an image 70A with the second display light reflected by the second display surface 7. The meter unit 70 directly emits the second display light toward the second display surface 7 from the second emitting portion 6 without passing through a reflection portion and the like, unlike the HUD unit 50.

The second emitting portion 6 can emit the second display light that is different from the first display light toward the second display surface 7. The second emitting portion 6 is provided at a position opposing the second light path opening 25 in the accommodation space portion 23 of the housing 2. The second emitting portion 6 is provided separately from the first emitting portion 3. Both of the first emitting portion 3 and the second emitting portion 6 in the embodiment are provided at the opposite side to the light path formation wall body 52 with the light path 51 interposed therebetween. The second display light emitted from the second emitting portion 6 is display light providing the image 70A that is displayed on the second display surface 7 and includes at least light of the wavelength in the visible light region. As the second emitting portion 6 as a device emitting the second display light, for example, a thin liquid crystal display, a plasma display, an organic EL display, an optical indicator, a fluorescent display tube, a laser irradiation device, a projector, or the like can be used. The second display light emitted to the second display surface 7 side by the second emitting portion 6 is guided to the outside of the housing 2 through the second light path opening 25.

The second display surface 7 displays various pieces of visible information with the second display light emitted from the second emitting portion 6. The second display surface 7 is provided at the outside of the accommodation space portion 23 of the housing 2. The second display surface 7 is provided on the above-mentioned light path formation wall body 52 as the light-shielding non-transmission member. The second display surface 7 is formed on a portion of the light path formation wall body 52 that is exposed at the upper side of the cover member CO in the vehicle height direction Z through the opening COa. The second display surface 7 is provided on the surface of the exposed portion of the light path formation wall body 52 at the vehicle cabin internal side, that is, at the viewing position EP side. The second display surface 7 is located so as to oppose the second emitting portion 6 in the emitting direction of the second display light by the second emitting portion 6. In other words, the above-mentioned second emitting portion 6 is provided at a position opposing the second display surface 7 through the second light path opening 25 in the emitting direction of the second display light in the accommodation space portion 23 of the housing 2. The second display surface 7 is located at the opposite side to the second emitting portion 6 with the light path 51 interposed therebetween in the emitting direction of the second display light by the second emitting portion 6. That is to say, both of the above-mentioned first emitting portion 3 and second emitting portion 6 are provided at the opposite side to the second display surface 7 provided on the light path formation wall body 52 with the light path 51 interposed therebetween. The second display surface 7 reflects, to the viewing position EP side, the second display light emitted from the second emitting portion 6. The second display surface 7 is configured as a mirror (mirror surface) that totally reflects, to the viewing position EP side, the second display light emitted from the second emitting portion 6. The second display surface 7 may be configured as a magnifying mirror (magnifying mirror surface) magnifying the second display light.

The meter unit 70 configured as described above guides the second display light emitted from the second emitting portion 6 to the outside of the housing 2 through the second light path opening 25 and causes the second display light to cross the light path 51 and reach the second display surface 7. The meter unit 70 causes the second display light that has reached the second display surface 7 to be reflected to the viewing position EP side by the second display surface 7. With this configuration, the meter unit 70 displays the image 70A with the second display light on the second display surface 7. The image 70A is a reflected image with the second display light after reflection to the viewing position EP side by the second display surface 7 and is a what-is-called virtual image capable of being viewed from the viewing position EP. The image 70A represents various pieces of visible information related to the vehicle V. The image 70A represents, for example, various pieces of visible information that are advantageous for the passengers of the vehicle V, such as traveling state information of the vehicle V, guidance information until the vehicle V arrives at a destination, and external environment information of the vehicle V. The image 70A may represent, for example, a vehicle speed, an output rotation speed of a traveling driving source, alert (tell-tale) information, shift position information, and direction indication information as more specific information with relatively higher priority than the pieces of visible information that are represented by the image 50A.

The display device 1 configured as described above is installed in the installation space portion SP such that the first light path opening 24 and the second light path opening 25 of the housing 2 of the display device main body 100 and the first display surface 5 and the second display surface 7 have predetermined positional relations. That is to say, the housing 2 is installed in the installation space portion SP with such positional relations that the first display surface 5 opposes the first light path opening 24 with the light path 51 interposed therebetween and the second display surface 7 opposes the second light path opening 25 with the light path 51 interposed therebetween. With this configuration, the housing 2 is installed at such a position that the first display surface 5 reflects, to the viewing position EP side, the first display light emitted from the first emitting portion 3 and reflected by the reflection portion 4 and the second display surface 7 reflects, to the viewing position EP side, the second display light emitted from the second emitting portion 6. In the display device 1, driving of the respective parts including the first emitting portion 3 and the second emitting portion 6 is controlled through the control circuit, the driving circuit, and the like. With this control, the display device 1 can display the images 50A and 70A with the first display light and the second display light on the first display surface 5 and the second display surface 7, respectively, and display various pieces of visible information related to the vehicle V in accordance with the images.

The display device 1 and the display device main body 100 described above causes the first display light emitted from the first emitting portion 3 to be reflected to the viewing position EP side by the first display surface 5 provided on the window shield WS. With this configuration, the display device 1 and the display device main body 100 make display with the first display light on the first display surface 5 such that it can be viewed from the viewing position EP. Furthermore, the display device 1 and the display device main body 100 causes the second display light emitted from the second emitting portion 6 to be reflected to the viewing position EP side by the second display surface 7 provided on the light path formation wall body 52 forming the light path 51 of the first display light. With this configuration, the display device 1 and the display device main body 100 make display with the second display light on the second display surface 7 such that it can be viewed from the viewing position EP. As a result, the display device 1 and the display device main body 100 can have the configurations enabling the first display surface 5 and the second display surface 7 to be easily set at desired places after the first emitting portion 3 and the second emitting portion 6 corresponding to the first display surface 5 and the second display surface 7, respectively, are provided at the positions separated from each other. The display device 1 and the display device main body 100 can have the configurations in which the second emitting portion 6 itself emitting the second display light may not be provided at the light path formation wall body 52 side and it is sufficient that the second display surface 7 is provided at the light path formation wall body 52 side. Consequently, the display device 1 and the display device main body 100 can have the configurations that are easy to be mounted even on a place at which an installation space is difficult to be ensured, for example, a place in the vicinity of the window shield WS in the installation space portion SP in the instrument panel IP. Accordingly, mountability of the display device 1 and the display device main body 100 can be improved. Furthermore, the display device 1 and the display device main body 100 are provided with the second display surface 7 serving as the light path formation wall body 52 for forming the light path 51 of the first display light. The number of components can therefore be reduced, thereby improving the mountability also in this point. Moreover, the display device 1 and the display device main body 100 can be provided with the second display surface 7 by effectively using the exposed portion of the light path formation wall body 52 that is exposed to the viewing position EP side. The light path formation wall body 52 itself can therefore be made inconspicuous and, for example, incongruity in appearance can be reduced.

With the display device 1 and the display device main body 100, both of the image 50A that is displayed with the first display light on the first display surface 5 and the image 70A that is displayed with the second display light on the second display surface 7 are the virtual images capable of being viewed from the viewing position EP. With this configuration, the display device 1 and the display device main body 100 can relatively decrease parallax distances of the image 50A on the first display surface 5 and the image 70A on the second display surface 7 in the vehicle front and rear direction X. As a result, the display device 1 and the display device main body 100 enable the image 50A and the image 70A to be easily focused, thereby improving visibility.

The display device 1 and the display device main body 100 include the housing 2 that collectively accommodates, in the accommodation space portion 23, the first emitting portion 3 and the second emitting portion 6. With this configuration, the display device 1 and the display device main body 100 can be collectively installed in the vehicle V in a state in which portions other than the first display surface 5 and the second display surface 7 are accommodated in the housing 2. As a result, the number of assembly processes of the display device 1 and the display device main body 100 on the vehicle V can be reduced and mountability thereof can be further improved. In addition, for example, manufacturing cost can be reduced.

In the display device 1 and the display device main body 100 described above, the first emitting portion 3 and the second emitting portion 6 are provided at the opposite side to the second display surface 7 with the light path 51 interposed therebetween. With this configuration, the display device 1 and the display device main body 100 can prevent the device from being increased in size by arranging the first emitting portion 3 and the second emitting portion 6 so as to be close to each other, thereby further improving mountability. The display device 1 and the display device main body 100 can also reduce a wiring amount on the control circuit and the like by arranging the first emitting portion 3 and the second emitting portion 6 so as to be close to each other, thereby, for example, reducing the manufacturing cost.

Moreover, the display device 1 and the display device main body 100 described above include the reflection portion 4 that reflects, to the first display surface 5 side, the first display light emitted the first emitting portion 3 and includes the second emitting portion 6 at the position opposing the second display surface 7 in the emitting direction of the second display light. With this configuration, the display device 1 and the display device main body 100 can be configured with such a positional relation that the second display light emitted from the second emitting portion 6 is directly emitted to the second display surface 7 without passing through a reflection portion or the like. With the positional relation, the display device 1 and the display device main body 100 enable the position of the first emitting portion 3 to be desirably adjusted by changing the light path of the first display light emitted from the first emitting portion 3 by the reflection portion 4. As a result, the display device 1 and the display device main body 100 can have more compact configurations, thereby further improving mount ability.

The above-mentioned display device and display device main body according to the embodiment of the present invention are not limited to the above-mentioned embodiment and various changes can be made in a range described in the scope of the invention.

Although the display device 1 and the display device main body 100 include the housing 2 in the above description, they may not include the housing 2 and the respective parts thereof may be directly assembled in the installation space portion SP in the instrument panel IP.

Although the display device 1 and the display device main body 100 include the reflection portion 4 in the above description, they are not limited to include the reflection portion 4.

Although the transmission member is the window shield WS in the above description, it is not limited to the window shield WS and may be a combiner that is provided separately from the window shield WS. The first display surface 5 may be provided on the combiner that is provided separately from the window shield WS.

The display device and the display device main body according to the present embodiment causes the first display light emitted from the first emitting portion to be reflected to the viewing position side by the first display surface provided on the transmission member. With this configuration, the display device and the display device main body make display with the first display light on the first display surface such that it can be viewed from the viewing position. The display device and the display device main body causes the second display light emitted from the second emitting portion to be reflected to the viewing position side by the second display surface provided on the non-transmission portion forming the light path of the first display light. With this configuration, the display device and the display device main body make display with the second display light on the second display surface such that it can be viewed from the viewing position. As a result, the display device and the display device main body can have the configurations enabling the first display surface and the second display surface to be easily set at desired places after the first emitting portion and the second emitting portion corresponding to the first display surface and the second display surface, respectively, are provided at the positions separated from each other. Consequently, the display device and the display device main body can have the configurations that are easy to be mounted even on, for example, the place at which the installation space is difficult to be ensured, thereby providing an effect of improving mountability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
   a first emitting portion, that is a first body, that emits first display light;
   a first display surface provided on a transmission member transmitting light and reflecting, to a viewing position side, the first display light being emitted from the first emitting portion;
   a second emitting portion that is a second body provided separately from the first emitting portion that is the first body, and the second emitting portion emits second display light that is different from the first display light;
   a second display surface facing the viewing position side, provided on a non-transmission member shielding light and forming at least a part of a light path of the first display light to the first display surface from the first emitting portion, and reflecting, to the viewing position side, the second display light being emitted from the second emitting portion; and
   a reflection portion that reflects, to the first display surface side, the first display light being emitted from the first emitting portion, wherein
   the second emitting portion is provided at a position opposing the second display surface in a direction opposite an emitting direction of the second display light and emits the second display light toward the second display surface directly, and
   both of a first image that is displayed with the first display light on the first display surface and a second image that is displayed with the second display light on the second display surface are virtual images.

2. The display device according to claim 1, further comprising:
   a housing that defines an accommodation space portion inside accommodating the first emitting portion and the second emitting portion.

3. The display device according to claim 2, wherein
   the first emitting portion and the second emitting portion are provided at an opposite side to the second display surface with the light path interposed.

4. The display device according to claim 2, wherein the light-shielding member, that shields light, is a light path formation wall body on which the second display surface is provided.

5. The display device according to claim 1, wherein
   the first emitting portion and the second emitting portion are provided at an opposite side to the second display surface with the light path interposed.

6. The display device according to claim 1, wherein
   a distance from a viewing position, on the viewing position side, to the second display surface is longer than a distance from the viewing position to the first display surface.

7. The display device according to claim 1, wherein
   a path of the first display light, towards the first display surface from the reflection portion, crosses a path of the second display light, towards the second display surface from the second emitting portion, in a projection plane extending in front-rear directions and height directions of the display device, and
   the path of the first display light and the path of the second display light cross, in the projection plane, at a position between the reflection portion and the second emitting portion, along the front-rear directions.

8. The display device according to claim 1, wherein
   the first display light and the second display light are emitted from the first emitting portion and the second emitting portion, respectively, in respective directions away from the viewing position side.

9. A display device main body comprising:
   a first emitting portion, that is a first body, configured to emit first display light toward a first display surface provided on a transmission member transmitting light;
   a second emitting portion that is a second body provided separately from the first emitting portion that is the first body, and the second emitting portion being configured to emit second display light that is different from the first display light toward a second display surface facing a viewing position side, provided on a non-transmission member shielding light, and forming at least a part of a light path of the first display light to the first display surface from the first emitting portion;
   a reflection portion that reflects, to the first display surface side, the first display light being emitted from the first emitting portion; and
   a housing that defines an accommodation space portion inside accommodating the first emitting portion, the reflection portion, and the second emitting portion, wherein
   the housing is installed at such a position that the first display surface reflects, to the viewing position side, the first display light being emitted from the first emitting portion and the second display surface reflects, to the viewing position side, the second display light being emitted from the second emitting portion,
   the second emitting portion is provided at a position opposing the second display surface in a direction opposite an emitting direction of the second display light and emits the second display light toward the second display surface directly, and
   both of a first image that is displayed with the first display light on the first display surface and a second image that is displayed with the second display light on the second display surface are virtual images.

10. The display device main body according to claim 9, wherein a path of the first display light, towards the first display surface from the reflection portion, crosses a path of the second display light, towards the second display surface from the second emitting portion, in a projection plane extending in front-rear directions and height directions of the display device main body, and the path of the first display light and the path of the second display light cross, in the projection plane, at a position between the reflection portion and the second emitting portion, along the front-rear directions.

\* \* \* \* \*